United States Patent [19]

Stas et al.

[11] Patent Number: 4,595,577

[45] Date of Patent: Jun. 17, 1986

[54] TREATMENT OF GASES CONTAINING ORGANIC SULPHUR COMPOUNDS

[75] Inventors: Georges Stas, Ottignies, Belgium; Christian Biver, L-Hagen, Luxembourg

[73] Assignee: Interox (Société Anonyme), Brussels, Belgium

[21] Appl. No.: 593,576

[22] Filed: Mar. 26, 1984

Related U.S. Application Data

[62] Division of Ser. No. 363,950, Mar. 31, 1982, Pat. No. 4,443,342.

[30] Foreign Application Priority Data

Mar. 31, 1981 [FR] France ................. 81 06589

[51] Int. Cl.$^4$ ............................................. B01J 8/00
[52] U.S. Cl. .................................... 423/245; 162/51; 423/224
[58] Field of Search ............... 423/224, 245 R, 245 S; 55/37, 73, 84; 210/759, 763, 766, 928; 162/29, 51, 30.11

[56] References Cited

U.S. PATENT DOCUMENTS

| | | | |
|---|---|---|---|
| 3,178,260 | 4/1965 | Tirado | 210/928 |
| 3,186,942 | 6/1965 | Benger | 210/763 |
| 3,200,069 | 8/1965 | Eisenhauer | 210/759 |
| 3,510,424 | 5/1970 | Zumbrunn | 210/759 |
| 3,794,711 | 2/1974 | Bhatra | 423/245 R |
| 3,969,479 | 7/1976 | Lonnes | 423/245 R |
| 4,002,722 | 1/1977 | Suzuki | 423/245 R |
| 4,009,251 | 2/1977 | Meuly | 210/763 |
| 4,029,578 | 6/1977 | Turk | 210/763 |
| 4,294,703 | 10/1981 | Wilms | 210/763 |
| 4,307,067 | 12/1981 | Tagawa | 423/245 R |
| 4,363,215 | 12/1982 | Sharp | 210/763 |
| 4,431,617 | 2/1984 | Farin | 423/245 R |

FOREIGN PATENT DOCUMENTS

| | | | |
|---|---|---|---|
| 53-95170 | 8/1978 | Japan | 210/759 |
| 56-17686 | 2/1981 | Japan | 210/759 |

OTHER PUBLICATIONS

Interox, Effluent and Water Treatment Journal, Aug. 1979, pp. 1–42.

Primary Examiner—Ernest G. Therkorn
Attorney, Agent, or Firm—Spencer & Frank

[57] ABSTRACT

Process for the treatment of waste water and gases containing dialkyl disulphides by catalytic oxidation of these compounds by means of a peroxide compound in an aqueous medium. Divalent copper ions are used for the catalyst and the medium is kept at a pH below 6.5.

8 Claims, No Drawings

TREATMENT OF GASES CONTAINING ORGANIC SULPHUR COMPOUNDS

This application is a division, of application Ser. No. 06/363,950, filed Mar. 31, 1982, now U.S. Pat. No. 4,443,342.

The present invention relates to a process for the treatment of waste water and gases, particularly the latter, containing organic sulphur compounds, by means of peroxide compounds such as hydrogen peroxide.

The sewage from public systems and certain types of industrial waste water contain evil-smelling and toxic organic sulphur compounds which can be responsible for colouring the water.

Thus, in the paper industry, during the digestion of the wood chips in the kraft process, organic sulphur compounds are formed, such as methylmercaptan, dimethyl sulphide and dimethyl disulphide, which are found again in the black liquors from digestion, the condensates from digestion, the wash water and the water from bleaching of the pulp.

The presence of these sulphur compounds in these effluents presents various problems. Thus, the calcination of the sludges obtained by concentration of the black liquors is accompanied by nauseating smells. Likewise, the condensates from digestion, the water from washing of the unbleached pulp resulting from digestion, and, if appropriate, the waste water from certain bleaching steps, cannot be discharged as such, because of their brownish colouration and their unpleasant smell.

To remove these organic sulphur compounds, it is known to subject them to oxidation, which leads to the formation of odourless and non-toxic compounds. Peroxide compounds have proved effective for this purpose. Thus, it has already been proposed to remove the organic sulphur compounds (mercaptans, dialkyl sulphides and dialkyl disulphides) present in certain waste gases, by treating them with an acid aqueous solution of hydrogen peroxide, in the presence of an iron catalyst (Interox, Effluent & Water Treatment Journal, August 1979). However, the treatments known hitherto do not make it possible to oxidise all the organic sulphur compounds quantitatively and to convert them totally to odourless products. More particularly, dialkyl disulphides are particularly resistant to complete oxidation, and the bad smells and the colourations for which these compounds are responsible cannot be removed completely by the known treatments.

SUMMARY OF THE INVENTION

The object of the present invention is to increase the degree of oxidation of the organic sulphur compounds present in waste water and gases, and especially that of dialkyl disulphides and more particularly of dimethyl disulphide, and their conversion to odourless, non-toxic and colourless compounds.

To do this, the invention relates to a process for the treatment of waste water and gases containing dialkyl disulphides, by catalytic oxidation of these compounds by means of a peroxide compound, in an aqueous medium, in which process divalent copper ions are used as the catalyst and the medium is kept at a pH below 6.5.

DETAILED DESCRIPTION OF THE INVENTION

The process of the present invention is particularly applicable to effluents containing $C_2$–$C_{10}$ dialkyl disulphides. The best results have been obtained with the oxidation of dimethyl disulphide. The process can also be applied to the treatment of effluents also containing other organic sulphur compounds.

The copper ions can be introduced into the aqueous reaction medium in the form of any organic or inorganic compound which is soluble at the concentrations used and can dissociate into ions. It is preferred to use halides such as the fluoride, chloride and bromide, the nitrate, the sulphate, the chlorate, the bromate, the iodate, the perchlorate, the metaborate, the dichromate, the fluosilicate, or carboxylates such as the acetate, the formate and the oxalate. The best results have been obtained with the acetate, the nitrate, the sulphate and the chloride. Copper sulphate is particularly suitable.

It is also possible to use mixtures of copper compounds.

The amount of copper ions to be used in the reaction medium can vary within wide limits. It is generally from 0.0001 to 5 grams per liter. It is preferred to use a solution containing from 0.001 to 1 gram of copper ions per liter of medium. Good results have been obtained by using from 0.001 to 0.100 gram of copper ions per liter of medium.

Various types of peroxide compounds can be used as oxidising agents. Thus, it is possible to use organic or inorganic peroxide compounds. It is preferred to use peroxide compounds chosen from amongst percarboxylic acids such as performic acid, peracetic acid, perpropionic acid, perbutyric acid, perphthalic acids and their substituted derivatives, salts corresponding to these peracids, such as the alkali metal and alkaline earth metal salts and ammonium salts, inorganic per-salts such as the percarbonates, perborates, persulphates, persilicates and perphosphates of all types of alkali metals and alkaline earth metals and of ammonium, inorganic peracids such as peroxymonosulphuric and peroxydisulphuric acids and peroxyphosphoric acids, metal peroxides, more particularly alkali metal and alkaline earth metal peroxides, such as the peroxides of sodium, potassium, calcium and magnesium, and hydrogen peroxide. Good results have been obtained with hydrogen peroxide, peroxymonosulphuric acid and peracetic acid. Hydrogen peroxide is particularly suitable. It is also possible to use mixtures of peroxide compounds.

The amount of peroxide compounds to be used can vary within wide limits. In general, the peroxide compound is used in proportions such that the ratio of the amount of peroxide compound, expressed in mol equivalents of 100% strength $H_2O_2$, to the amount of dialkyl disulphides, expressed in mol equivalents of $H_2S$, is more than 0.2 and preferably more than 0.5.

In general, for economic reasons, molar ratios of more than 20 are not used. Most frequently, the molar ratios are less than 10. Good results have been obtained by using molar ratios of 1 to 6 and preferably of 3 to 6.

If the process is applied to the treatment of effluents also containing other organic sulphur compounds, the amount of hydrogen peroxide used is of course increased by the amount required to oxidise them.

In general, the process according to the invention is carried out at an acid pH. Preferably, it is carried out at a pH below 6.5. Good results are obtained by keeping the pH at a value of 2.5 to 6.5 and preferably of 3 to 5. The best results are obtained with a pH of about 4. To reach the desired pH, the aqueous solution can be acidified by adding various types of acids. Organic or inorganic acids can be used for this purpose. Preferably, the acids are chosen from amongst acetic acid, formic acid, sulphuric acid, hydrochloric acid, nitric acid and phosphoric acid. Good results have been obtained with sulphuric acid and acetic acid. The best results have been obtained with sulphuric acid.

The temperature at which the treatment of the effluents is carried out is generally chosen between ambient temperature and the boiling point of the reaction medium. It is generally preferred to use temperatures above 40° C., so as to reduce the treatment time. Good results are obtained at temperatures of 50° to 90° C. and preferably of 60° to 80° C.

The reaction time can vary from case to case. It is generally more than 0.5 minute and most frequently more than 2 minutes. The reaction time does not generally exceed 200 minutes and most frequently 100 minutes. Good results have been obtained with reaction times of 2 to 100 minutes.

Various operating techniques and various apparatuses which are in themselves known can be used for carrying out the process according to the invention. Provision can also be made for introducing the peroxide compound and the catalyst conjointly or separately.

In general, during the treatment of waste water, the pH and the temperature are adjusted beforehand, if necessary, and the peroxide compound and the catalyst are then introduced conjointly or separately, if appropriate in the form of an aqueous solution, so as to obtain the desired concentrations.

To treat waste gases, they are generally brought into contact with an aqueous solution containing the peroxide compound and the catalyst and having the desired pH and temperature. If appropriate, the aqueous medium can contain other additives such as products capable of increasing the solubility of dialkyl disulphides, for example alcohols and more particularly methanol. It is thus possible to wash the gases to be treated in apparatuses such as wet scrubbers, for example packed scrubbers operating in co-current or, preferably, in countercurrent.

The process according to the invention can be applied to various types of effluents, both liquid and gaseous, containing dialkyl disulphides.

Thus, it can be applied to the treatment of urban effluents and effluents from paper mills, textile industries (from the manufacture of, for example, viscose rayon), tanneries, farms and food industries (knacker's yards, fish processing, breweries, and manufacture of soya oil), pharmaceutical industries, petrochemical installations (refineries), installations for the manufacture of various sulphur-based compounds (pesticides, cutting oils, wetting agents, and additives for plastics and rubbers), metallurgical and ore-processing industries, and installations for the desulphurisation of cast iron. The process according to the invention is particularly suitable for the treatment of effluents from paper mills.

The process according to the invention makes it possible advantageously to treat the black liquors obtained by digestion of the wood chips in a kraft process. In this case, the black liquors, diluted if appropriate, are advantageously subjected to preliminary oxidation in air, according to a technique which is in itself known, before they are subjected to the process according to the invention. The black liquors are then concentrated and the sludges obtained are calcined in recovery kettles. The fumes produced are distinctly less odorous. The process also makes it possible advantageously to treat certain coloured and evil-smelling, aqueous effluents from the manufacture of kraft pulp, such as the condensates from digestion, the condensates from evaporation of the black liquor, the liquids from washing of the unbleached pulp, and certain effluents from bleaching. The process is very particularly suitable for the treatment of the condensates from digestion, which contain larger proportions of dimethyl disulphide, a product which is particularly difficult to oxidise according to the known techniques.

Finally, it is also advantageous to recover the evil-smelling gases produced an installation for digestion according to the kraft process, collect them together and subject them to a treatment according to the invention.

Practical examples of the invention are given below, demonstrating the efficiency of the process according to the invention (Examples 2 and 4 to 7) by comparing it with a process in which an iron catalyst is used (Examples 1 and 3, given by way of comparison).

EXAMPLES OF THE OXIDATION OF DIMETHYL DISULPHIDE BY HYDROGEN PEROXIDE

A synthetic solution is prepared from 1.5 ml of dimethyl disulphide, made up to 5 liters with demineralised water containing 2 ml of methanol per liter in order to enable the dimethyl disulphide, which is normally insoluble in pure water, to dissolve. The solution contains 318 mg of dimethyl disulphide, that is to say 230 mg of sulphides, expressed in equivalents of $H_2S$ per liter.

The solution is acidified to pH 4 by adding $H_2SO_4$, and heated to a temperature of 70° C. The catalyst is then introduced at a rate of 50 mg of metal ions per liter.

Two catalysts are examined: copper sulphate, according to the invention (Examples 2 and 4 to 7), and iron sulphate, by way of comparison (Examples 1 and 3).

Varying proportions of hydrogen peroxide are introduced.

The residual dimethyl disulphide is measured by vapour phase chromatography after a reaction time of 30 or 60 minutes.

The operating conditions, the proportions of residual dimethyl disulphide (DMDS) and its degree of destruction are given in Table 1.

TABLE 1

| Example | Catalyst | $H_2O_2$ Sulphides expressed in terms of $H_2S$ mols/mol | Time mins. | Residual DMDS mg/l | Degree of destruction of DMDS % |
|---|---|---|---|---|---|
| 1 | $Fe_2(SO_4)_3$ | 1.44 | 30 | 86 | 73 |
| 2 | $CuSO_4$ | 1.44 | 30 | 46 | 86 |
| 3 | $Fe_2(SO_4)_3$ | 2.87 | 60 | 48 | 85 |
| 4 | $CuSO_4$ | 2.87 | 30 | 14 | 96 |
| 5 | $CuSO_4$ | 2.87 | 60 | 9 | 97 |
| 6 | $CuSO_4$ | 4.31 | 30 | 4 | 99 |
| 7 | $CuSO_4$ | 4.31 | 60 | 1 | 99.7 |

We claim:
1. Process for the treatment of waste gases containing dialkyl disulphides, by catalytic oxidation of these compounds by means of a peroxide compound, in an aque- ous medium, wherein divalent copper ions are used as the catalyst, the medium is kept at a pH of 2.5 to below 6.5, from 0.001 to 1 gram of copper ions is used per liter of medium, and the peroxide compound is used in an amount such that the ratio of the amount of peroxide compound, expressed in mol equivalents of 100% strength $H_2O_2$, to the amount dialkyl disulphides, expressed in mol equivalents of $H_2S$, is 0.5 to 10, the waste gases being washed by means of the medium.

2. Process according to claim 1 wherein the copper ions are introduced into the medium in the form of compounds chosen from amongst the halides, the nitrate, the sulphate, the chlorate, the bromate, the iodate, the perchlorate, the metaborate, the dichromate, the fluosilicate, the carboxylates and mixtures thereof.

3. Process according to claim 1 wherein the peroxide compound is chosen from amongst percarboxylic acids and corresponding salts, inorganic per-salts, inorganic peracids, metal peroxides, hydrogen peroxide and mixtures thereof.

4. Process according to claim 3, wherein the peroxide compound is chosen from amongst hydrogen peroxide, peroxymonosulphuric acid, peracetic acid and mixtures thereof.

5. Process according to claim 1, wherein the medium is kept at a temperature of 50° to 90° C.

6. Process according to claim 1, wherein an alcohol is added to the medium.

7. A process according to claim 1, wherein 86% or greater of the dialkyl disulfides are oxidized.

8. A process according to claim 7, wherein at least 96% of the dialkyl disulfides are oxidized.

* * * * *